(No Model.)

3 Sheets—Sheet 1.

C. F. SHORE.
FIRE ESCAPE.

No. 306,871. Patented Oct. 21, 1884.

Witnesses,

Inventor,
C. F. Shore
By Dewey & Co.
Att'ys (No Model.) 3 Sheets—Sheet 2.
C. F. SHORE.
FIRE ESCAPE.
No. 306,871. Patented Oct. 21, 1884.
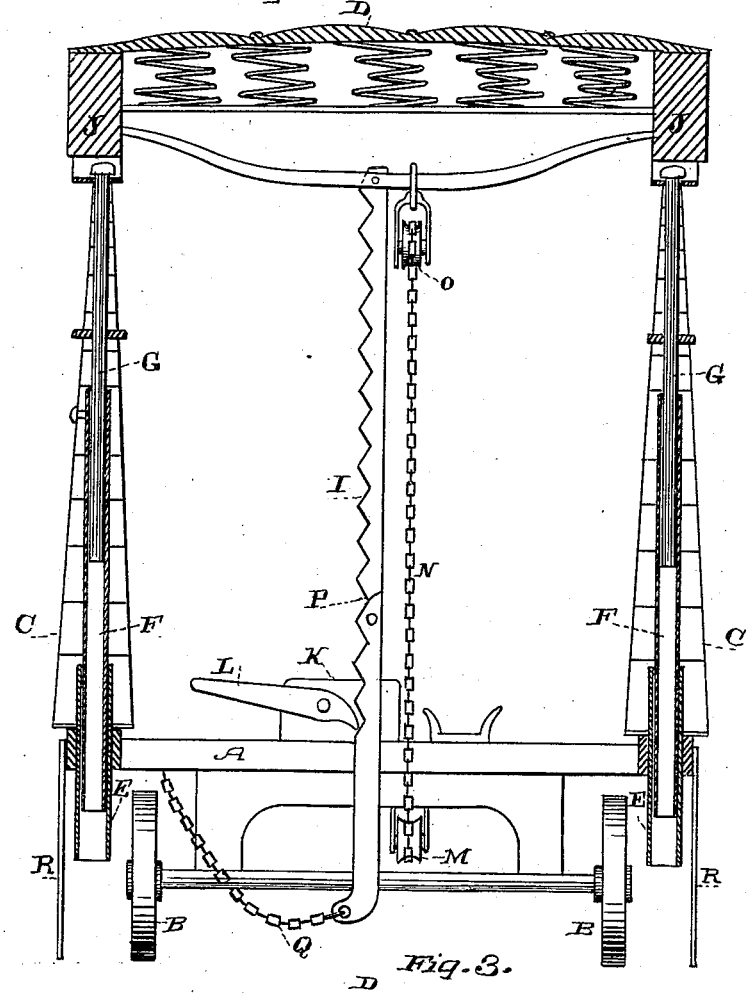
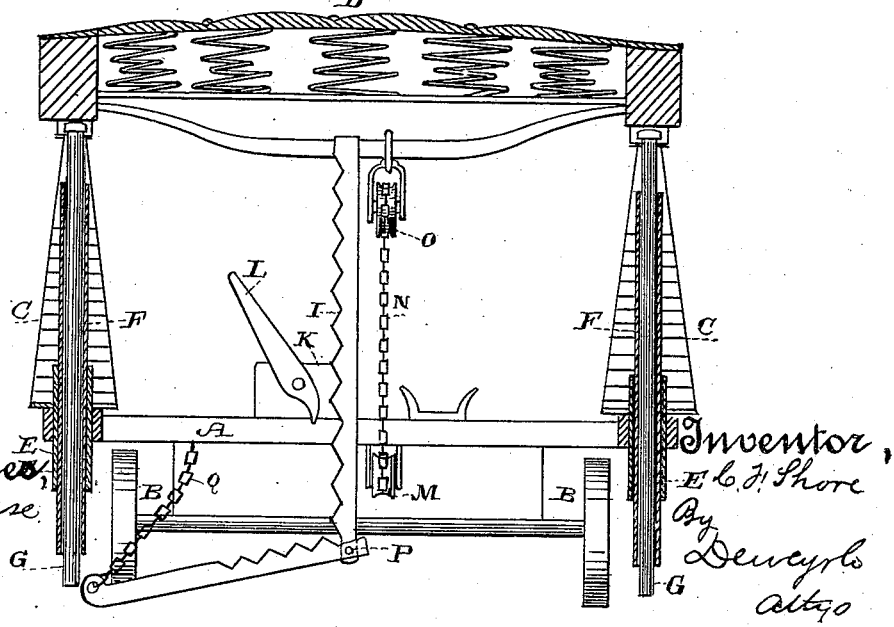

(No Model.)  C. F. SHORE.  3 Sheets—Sheet 3.
FIRE ESCAPE.

No. 306,871.  Patented Oct. 21, 1884.

Witnesses,
J. L. Nourse.
N. C. Lee

Inventor,
C. F. Shore
By Dewcyrlo
Att'ys

United States Patent Office.

CHARLES F. SHORE, OF SACRAMENTO, CALIFORNIA.

FIRE-ESCAPE.

SPECIFICATION forming part of Letters Patent No. 306,871, dated October 21, 1884.

Application filed July 14, 1884. (No model.)

*To all whom it may concern:*

Be it known that I, CHARLES F. SHORE, of the city of Sacramento, in the county of Sacramento and State of California, have invented an Improvement in Fire-Escapes; and I hereby declare the following to be a full, clear, and exact description thereof.

My invention relates to an apparatus which is useful, principally, as a means for escaping from burning buildings or other places of peril having considerable altitude.

It consists of a bed or cushion supported upon elastic springs, and having telescopic guide-rods by which its movement is made in a vertical line; a means for retaining it at the lowest point to which it may be pressed by the weight falling upon it; a means for releasing it and allowing it to again rise to its highest point, and means for compressing it for the purpose of transportation, when necessary, together with certain other details of construction, all of which will be more fully explained in the accompanying drawings, in which—

Figure 1:
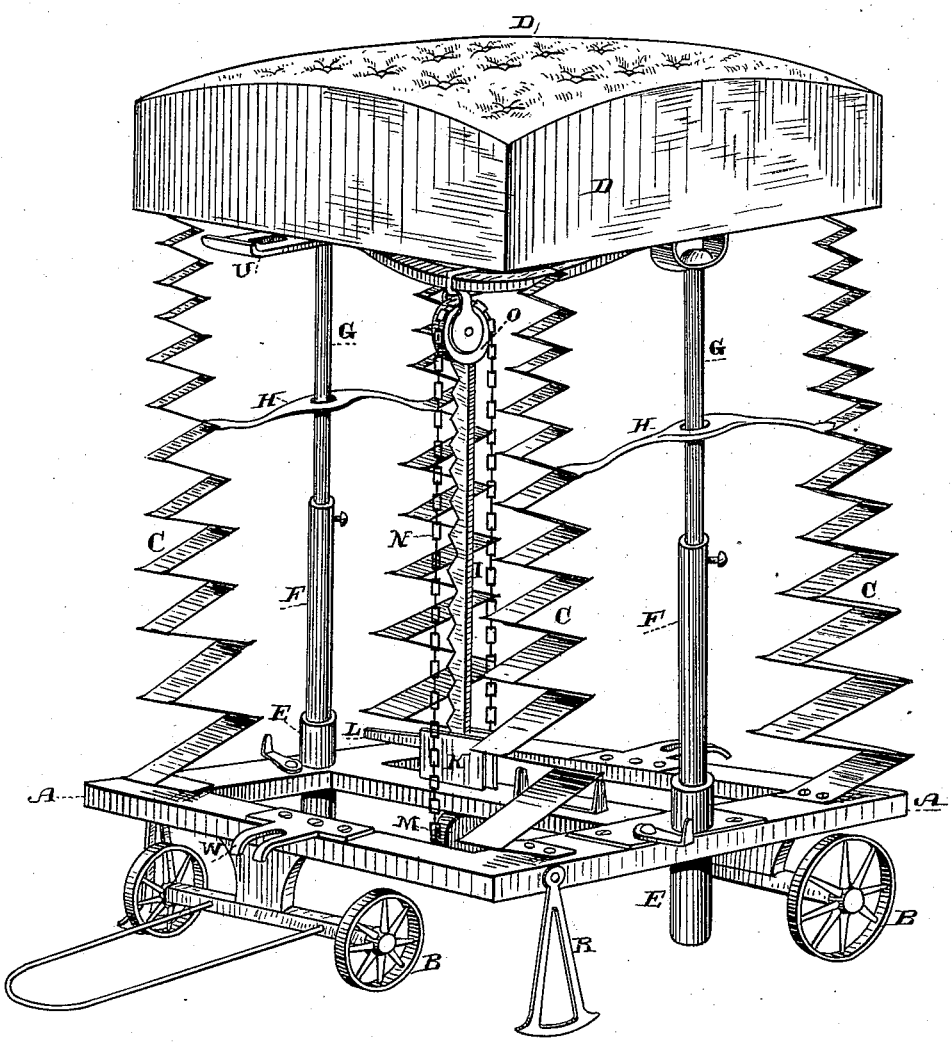
Figure 4:
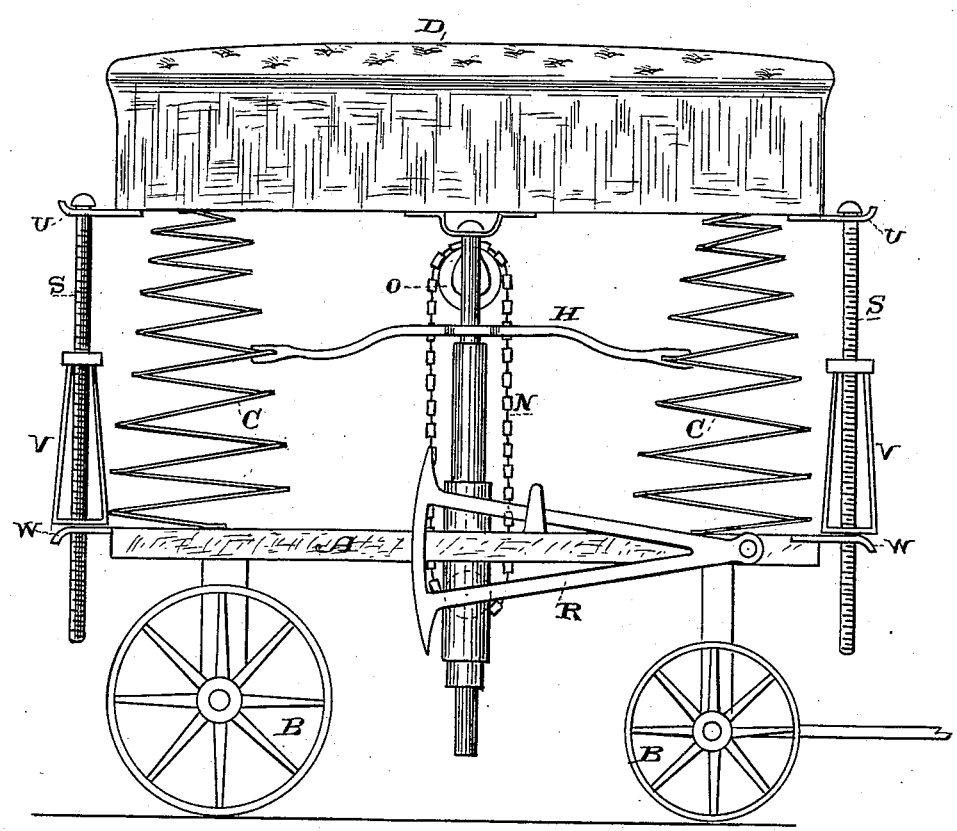

Figure 1 is a perspective view. Figs. 2 and 3 are vertical sections. Fig. 4 is a side view.

A is a frame or truck, which is preferably mounted upon wheels B, so that it can be easily transported from place to place, the front wheels being mounted upon a short axle, and being low enough so that they may be turned very short and the machine moved into any desired position with little difficulty. From each corner of this frame, and from other points, if found desirable, springs C, of any suitable kind and size, extend upward to a considerable height, and upon the top of these springs is supported an elastic bed or cushion, D.

In the sides of the frame A are fitted stout tubular sleeves E, through which the telescopic rods F and G are fitted to slide, the upper end of the upper portions of the rods being connected with the bottom of the bed. These guides serve to steady the movement of the bed and insure its moving up and down in a vertical line.

The springs may be united at suitable points by transverse bars H, which in the present case are shown attached in the meeting edges of the sleeves, and made broad enough in the center to have a hole made to allow the telescopic guide-rod G to pass through the hole, so that it may be moved easily, while at the same time it prevents the springs from being forced out of line from one side to the other by any violent, sudden, or unequal shock upon them.

The bed is made of suitable thickness, and upholstered with stout springs and bedding upon the surface, so as to have considerable elasticity in itself, and so that a person falling upon it from any considerable height will not be injured. When a person falls upon this bed, his weight will cause the springs supporting it to be compressed, and the bed will sink down to a considerable distance, depending upon the weight of the person and the height from which he falls, thus relieving to a great extent the shock of the fall. In order to prevent a recoil of these springs, which will throw a person upward and off the bed, so as to injure him perhaps as seriously as the original fall, I construct a device by which the bed may be stopped at any point to which it may be forced by the weight falling upon it. To do this I have a vertical rack-bar, I, secured to a stout bar or frame extending across just beneath the bed-frame J, and this passes through a guide, K, on the main frame A. Within this guide a pawl-lever, L, is pivoted, and when this lever lies horizontally its end extends inward in such a manner as to engage the corrugations or teeth of the rack-bar. By this it will be seen that whenever the bed has been forced down four or eight feet, or any other distance, by the weight falling upon it, the rack-bar will slide through its guide, moving downward with the bed, and when it has reached its lowest point the pawl will engage the teeth and prevent the bed again rising. The person may then be removed and the bed allowed to rise to its original position to receive another one by the following means:

Beneath the center bar of the frame A, and nearly by the side of the vertical rack-bar, may be secured a pulley or roller, M, around which the chain N may be passed, and a roller or pulley-block, O, may be attached to the cross-bar beneath the bed-frame, and by the side of the rack. This tackle may be pulled upward by an attendant until the chain is taut and holds the bed in its position. The pawl-lever may then be turned up so as to be free from the vertical rack-bar, and the bed may be allowed to rise slowly, being controlled by the attendant by means of the chain and pulleys, these being perfectly slack while the bed is at its highest point, and in no way interfering with its downward movement. As the bed may have a movement of as much as twelve feet or more in a vertical direction and it is not desirable to place the supporting-frame A too high from the ground, it will be seen that some provision may be made for the rack-bar and the guides at the side when the bed is forced down to a considerable distance. The guides are made telescopic, so that when one portion has reached the lowest point to which it can move the other one will move into it. The rack-bar is jointed at one or more points in its length, as shown at P, and a chain, Q, is attached to its lower end and also to the bottom of the frame at one side. When the lower end of the rack-bar has reached a point near the ground, this chain will pull it off to one side if the rack-bar descends any farther. This portion of the bar then moves out to one side and does not strike the ground.

In order to steady the apparatus when it is in its place ready for work, and as the front wheels do not offer as firm a base as may be desired, I have shown arms R, which are pivoted to the side of the frame near the front, and are long enough to reach to the ground. That portion which is intended to rest upon the ground is curved, so as to form a segment of which the pivot-pin is the center, and if it be necessary to start the apparatus in one direction or the other these supports will offer no resistance and will easily swing back into place again when the apparatus is stopped. If it be desirable to compress the springs and draw the bed downward somewhat for the purpose of traveling from place to place, it may be done by the means of a powerful block or tackle, or it may be done by means of screws S, the lower ends of which pass through the slotted plates W upon the main frame, and have heads, as shown. The upper ends of the screws pass through nuts at U, and in shackles or turn-buckles V, which are attached to plates W, projecting from the sides of the bed.

Having thus described my invention, what I claim as new, and desire to secure by Letters Patent, is—

1. A fire-escape consisting of a vertical truck or frame-work, springs extending vertically upward from its periphery and supporting an elastic bed or table from their ends, vertically-moving telescopic guides attached to the bed and extending through the truck, as herein described.

2. A portable truck or frame with vertical springs supporting an elastic bed or table upon the top, vertically-moving guides extending from the bed to the frame, and transverse bars uniting the springs and connected with the guide-rods, so as to insure a vertical motion of the same, as herein described.

3. In a fire-escape, a portable truck having a series of springs extending vertically upward therefrom, and supporting a bed or table upon their upper ends, telescopic rods by which the bed and springs are caused to operate in a vertical line, and means, as set forth, for retaining the bed at the lowest point to which it may be depressed, as herein described.

4. In a fire-escape, a portable elastic bed supported upon springs with guides, as shown, together with a vertically-moving rack-bar, and attached to the bed and extending through guides on the frame, and a holding-pawl, said rack-bar being jointed and having a chain or link attached to its lower end, so as to cause that portion to move outward at an angle when the bed is depressed, as herein described.

5. In a portable fire-escape, an elastic bed supported upon springs with guides, and a rack-bar and pawl to retain it at its lowest point, together with a block and chain or tackle by which it may be held while the pulley is released, and then allowed to rise gradually to its normal position, as herein described.

6. In a fire-escape, an elastic bed with guides and springs supported from a frame mounted upon wheels, as shown, together with the braces or supports hinged to the corners of the frame, and having their outer ends curved so as to rest upon the ground, as herein described.

In witness whereof I have hereunto set my hand.

CHARLES F. SHORE.

Witnesses:
JABEZ TURNER,
ADNA PHELPS.